US008850594B2

(12) United States Patent
Bellwood et al.

(10) Patent No.: US 8,850,594 B2
(45) Date of Patent: *Sep. 30, 2014

(54) DIGITAL RIGHTS MANAGEMENT OF CAPTURED CONTENT BASED ON CAPTURE ASSOCIATED LOCATIONS

(75) Inventors: Thomas A. Bellwood, Austin, TX (US); Gabriel A Cohen, San Mateo, CA (US); Travis M. Grigsby, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/428,906

(22) Filed: Mar. 23, 2012

(65) Prior Publication Data

US 2012/0201418 A1    Aug. 9, 2012

Related U.S. Application Data

(63) Continuation of application No. 12/037,287, filed on Feb. 26, 2008, now Pat. No. 8,185,959.

(51) Int. Cl.
*G06F 7/04* (2006.01)
*G06F 17/30* (2006.01)
*H04N 7/16* (2011.01)
*G06F 21/10* (2013.01)

(52) U.S. Cl.
CPC ............. *G06F 21/10* (2013.01); *H04L 2209/60* (2013.01); *G06F 2221/074* (2013.01); *H04L 2209/603* (2013.01); *H04L 2209/64* (2013.01); *H04L 2463/103* (2013.01)
USPC .................... 726/26; 726/1; 726/27; 713/176

(58) Field of Classification Search
CPC ................ G06F 21/10; H04L 2209/60; H04L 2209/603; H04L 2209/64; H04L 2463/103
USPC ................................... 726/1, 26, 27; 713/176
See application file for complete search history.

(56) References Cited

U.S. PATENT DOCUMENTS 5,488,664 A    1/1996  Shamir
5,513,272 A    4/1996  Bogosian, Jr.
(Continued)

FOREIGN PATENT DOCUMENTS

JP    2005223458 A    8/2005
JP    2007078010       7/2007
(Continued)

OTHER PUBLICATIONS

Notice of Allowance, U.S. Appl. No. 13/193,590, filed Jul. 28, 2011, In Re Thomas A. Bellwood et al, mailing dateMay 7, 2012, 16 pages.

(Continued)

*Primary Examiner* — Evans Desrosiers
*Assistant Examiner* — Daniel Potratz
(74) *Attorney, Agent, or Firm* — Parashos T. Kalaitzis; Amy J. Pattillo

(57) ABSTRACT

A certification is received from a user stating that captured content does not comprise a particular restricted element and a request from the user for an adjustment of a digital rights management rule identified for the captured content based on the captured content comprising the particular restricted element. At least one term of the digital rights management rule is adjusted to reflect that the captured content does not comprise the particular restricted element. The usage of the captured content by the user is monitored to determine whether the usage matches the certification statement.

18 Claims, 6 Drawing Sheets

(56) References Cited

U.S. PATENT DOCUMENTS

| | | | |
|---|---|---|---|
| 6,871,200 B2* | 3/2005 | MacQueen et al. | 707/770 |
| 6,934,860 B1 | 8/2005 | Goldstein | |
| 7,092,568 B2 | 8/2006 | Eaton | |
| 7,113,912 B2* | 9/2006 | Stefik et al. | |
| 7,171,018 B2 | 1/2007 | Rhoads et al. | |
| 7,171,558 B1 | 1/2007 | Mourad et al. | |
| 7,245,483 B2 | 7/2007 | Feague et al. | |
| 7,369,677 B2 | 5/2008 | Petrovic et al. | |
| 7,681,241 B2* | 3/2010 | Cox | 726/27 |
| 7,707,224 B2* | 4/2010 | Chastagnol et al. | 707/783 |
| 7,742,624 B2 | 6/2010 | Super et al. | |
| 7,778,440 B2 | 8/2010 | Malone | |
| 8,095,991 B2 | 1/2012 | Bellwood et al. | |
| 2002/0161996 A1 | 10/2002 | Koved et al. | |
| 2003/0023561 A1 | 1/2003 | Stefik et al. | |
| 2003/0154386 A1 | 8/2003 | Wittkotter | |
| 2003/0231186 A1 | 12/2003 | Larson, Jr. et al. | |
| 2004/0049694 A1 | 3/2004 | Candelore | |
| 2005/0089164 A1 | 4/2005 | Lang et al. | |
| 2005/0192904 A1 | 9/2005 | Candelore | |
| 2006/0059096 A1 | 3/2006 | Dublish et al. | |
| 2006/0059560 A1 | 3/2006 | Montulli | |
| 2006/0167803 A1 | 7/2006 | Aydar et al. | |
| 2006/0212704 A1 | 9/2006 | Kirovski et al. | |
| 2007/0143830 A1 | 6/2007 | Abraham et al. | |
| 2007/0270695 A1 | 11/2007 | Keen | |
| 2008/0060083 A1 | 3/2008 | Koved et al. | |
| 2009/0083856 A1 | 3/2009 | Aisu et al. | |
| 2009/0216769 A1 | 8/2009 | Bellwood et al. | |
| 2009/0217343 A1 | 8/2009 | Bellwood et al. | |
| 2009/0217344 A1 | 8/2009 | Bellwood | |
| 2011/0289601 A1 | 11/2011 | Bellwood et al. | |

FOREIGN PATENT DOCUMENTS

| | | |
|---|---|---|
| WO | 2007077521 A2 | 12/2007 |
| WO | 2007077521 A3 | 12/2007 |

OTHER PUBLICATIONS

Office Action, U.S. Appl. No. 13/193,590, filed Jul. 28, 2011, Thomas A. Bellwood et al, mailing date Apr. 5, 2012, 33 pages.
Office Action, U.S. Appl. No. 12/037,274, filed Feb. 26, 2008, Thomas A. Bellwood et al, mailing date Feb. 22, 2011, 19 pages.
Search Report, PCT/EP2009/050817, International Business Machines Corporation, filed Jan. 26, 2009, mailing date May 14, 2009, 9 pages.
USPTO Office Action, U.S. Appl. No. 12/037,287, filed Feb. 26, 2008, Thomas A Bellwood, mailing date Mar. 4, 2011, 29 pages.
USPTO Final Office Action, U.S. Appl. No. 12/037,287, filed Feb. 26, 2008, Thomas A Bellwood, mailing date Oct. 17, 2011, 26 pages.
USPTO Notice of Allowance, U.S. Appl. No. 12/037,287, filed Feb. 26, 2008, Thomas A Bellwood, mailing date Jan. 8, 2012, 34 pages.
USPTO Office Action, U.S. Appl. No. 12/037,275, filed Feb. 26, 2008, Thomas A Bellwood, mailing date Sep. 14, 2010, 20 pages.
Office Action, U.S. Appl. No. 12/037,275, filed Feb. 26, 2008, Thomas A. Bellwood et al, mailing date Mar. 18, 2011, 15 pages.
Notice of Allowance, U.S. Appl. No. 12/037,274, filed Feb. 26, 2008, Thomas A. Bellwood et al, mailing date Sep. 2, 2011, 12 pages.
Notice of Allowance, U.S. Appl. No. 12/037,274, filed Feb. 26, 2008, Thomas A. Bellwood et al, mailing date Jun. 27, 2011, 12 pages.
Arrington, Michael, "Riya 2.0 on the Way; Major Strategy Shift", Tech Crunch.com, Jun. 15, 2006, 1 page, [Online], [Retrieved on Jan. 14, 2008]. Retrieved From the Internet <http://www.techcrunch.com/2006/06/15/riya-20-on-the-way-major-strategy-shift/>.
Kanellos, Michael, "Smoking Out Photo Hoaxes With Software", CNET News.com, Feb. 1, 2006, 2 Pages, [Online], [Retrieved on Jan. 14, 2008]. Retrieved From the Internet <http://www.news.com/2102-1008_3-6033312.html?tag=st.util.print>.
No Author, "Windows Tool for Speech Analysis", UCL Dept of Phonetics and Linguistics, Copyright 2007, 2 Pages, [Online], [Retrieved on Jan. 14, 2008]. Retrieved From the Internet <http://www.phon.ucl.ac.uk/resource/sfs/wasp.htm>.
Eakins, John P. et al., "Similarity Retrieval of Trademark Images", IEEE Multimedia, Apr.-Jun. 1998, pp. 53-63, 11 Pages.
Office Action, U.S. Appl. No. 12/037,274, filed Feb. 26, 2008, Thomas A. Bellwood et al, mailing date Feb. 22, 2011, 11 pages.

* cited by examiner

DIGITAL RIGHTS MANAGEMENT OF CAPTURED CONTENT BASED ON CAPTURE ASSOCIATED LOCATIONS

CROSS-REFERENCE TO RELATED APPLICATIONS (1) U.S. patent application Ser. No. 12/037,275, filed Feb. 26, 2008, issued as U.S. Pat. No. 7,987,140 on Jul. 26, 2011; and (2) U.S. patent application Ser. No. 12/037,274, filed Feb. 26, 2008, issued as U.S. Pat. No. 8,095,991 on Jan. 10, 2012; and

BACKGROUND OF THE INVENTION

1. Field of the Invention

The present invention relates generally to improved digital rights management and in particular to an improved method, system, and program product for digital rights management of captured content based on at least one location associated with the capture of the captured content.

2. Description of the Related Art

More and more devices and applications are being developed and placed in the marketplace, where the devices are able to capture an image, a sound, or other content. In addition, many of these devices or applications allow capture of an image, a sound, or other content in a digitized format, where the content can then be easily distributed to other devices, transmitted over a network, or uploaded to a website.

Currently, a person or business that owns or manages the rights to content may distribute that content with digital rights management (DRM) rules for restricting use of the content. For example, the owner of rights to a trademark, a song, or a photo, may apply watermarking, encryption, or digital rules when distributing or outputting the content, to attempt to regulate digital usage of the digitized content by others.

Current DRM rules and systems do not, however, protect a content owner against unauthorized use of the content owner's work or image when that content is captured and distributed by another person. In particular, with the increase of portable devices and capture application, there is increased ability for an unauthorized user to capture content at many different locations. The owner of the rights to the content currently does not have a way to manage digital use of this content when captured by others. For example, if a person takes a picture that includes an image of a trademark, while the trademark holder may distribute authorized digital copies with DRM rules attached, the trademark holder does not have a way to manage the rights to use of the trademark captured by another person independent of the authorized digital copies distributed by the trademark owner. In another example, if a user captures a portion of a content owner's copyrighted website and places the captured portion on a blog or other online publication, the copyrighted content owner does not have a way to manage the rights to use of the copyrighted images on another person's online publication. In yet another example, a song owner may distribute authorized digital copies of a song, but if a person makes a digital copy of a song from a physical CD and distributes the digital copy of the song without the permission of the song owner, the song owner does not have a way to manage the distribution of the unauthorized copy of the song.

With the pervasive nature of the Internet and the ease with which captured content can be posted on websites and transmitted worldwide, it is not only businesses with ownership of trademarks and trade secrets, but also copyright holders, individuals, and authorized content distributors who desire to enforce their right to limit use of their physical likeness, who have a need to regulate the use of captured content.

SUMMARY

Therefore, in view of the foregoing, the present invention provides a method, system, process, and computer program product for providing digital rights management of captured content, where the management is specified based on one or more locations associated with the capture of the captured content.

In one embodiment, a method for digital rights management of captured content is directed to a computer receiving a certification from a user stating that captured content does not comprise a particular restricted element and a request from the user for an adjustment of a digital rights management rule identified for the captured content based on the captured content comprising the particular restricted element. The method is directed to the computer adjusting at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content. The method is directed to the computer monitoring whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification. The method is directed to the computer, responsive to detecting that the other content associated by the user with the captured content after the certification is embedded in the captured content does indicate the captured content comprises the particular restricted element specified in the embedded certification, blocking use of the captured content by the user at the one or more devices.

In another embodiment, a computer system for digital rights management of captured content comprises one or more processors, one or more computer-readable memories and one or more computer-readable, tangible storage devices. The computer system comprises program instructions, stored on at least one of the one or more storage devices for execution by at least one of the one or more processors via at least one of the one or more memories, to receive a certification from a user stating that captured content does not comprise a particular restricted element and a request from the user for an adjustment of a digital rights management rule identified for the captured content based on the captured content comprising the particular restricted element. The computer system comprises program instructions, stored on at least one of the one or more storage devices for execution by at least one of the one or more processors via at least one of the one or more memories, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content. The computer system comprises program instructions, stored on at least one of the one or more storage devices for execution by at least one of the one or more processors via at least one of the one or more memories, to monitor whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification. The computer system comprises program instructions, stored on at least one of the one or more storage devices for execution by at least one of the one or more processors via at least one of the one or more memories, responsive to detecting that the other content associated by the user with the captured content after the certification is embedded in the captured content does indicate the captured content comprises the particular restricted element specified in the embedded certification, to block use of the captured content by the user at the one or more devices.

In another embodiment, a computer program product for digital rights management of captured content comprises one or more computer-readable, tangible storage devices. The computer program product comprises program instructions, stored on at least one of the one or more storage devices, to receive a certification from a user stating that captured content does not comprise a particular restricted element and a request from the user for an adjustment of a digital rights management rule identified for the captured content based on the captured content comprising the particular restricted element. The computer program product comprises prom instructions, stored on at least one of the one or more storage devices, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content. The computer program product comprises program instructions, stored on at least one of the one or more storage devices, to monitor whether usage of the captured content by the user through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification. The computer program product comprises prom instructions, stored on at least one of the one or more storage devices, responsive to detecting that the other content associated by the user with the captured content after the certification is embedded in the captured content does indicate the captured content comprises the particular restricted element specified in the embedded certification, to block use of the captured content by the user at the one or more devices.

In detecting at least one relevant location associated with the captured content, a location detector detects a location of an image capture device capturing the captured content. In addition, in detecting at least one relevant location associated with the captured content, a location detector detects a distance between the position of the at least one restricted elements and a device capturing the captured content comprising the at least one restricted elements. Further, in detecting at least one relevant location associated with the captured content, a location detector detects a network address from which the owner of the captured content distributed at least one portion of the captured content.

In applying the at least one digital rights management rule with the at least one location based criteria specified by the at least one relevant location to restrict usage of the captured content, the at least one digital rights management rule is specified for any content captured within a particular location detected in the at least one relevant location. In addition, in applying the at least one digital rights management rule with the at least one location based criteria specified by the at least one relevant location to restrict usage of the captured content, usage of the captured content is restricted according to the applied at least one digital rights management rule with the at least one location based criteria specified by the at least one relevant location to at least one of storage of the captured content, use of the captured content by an application, and uploading the captured content to a web service.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
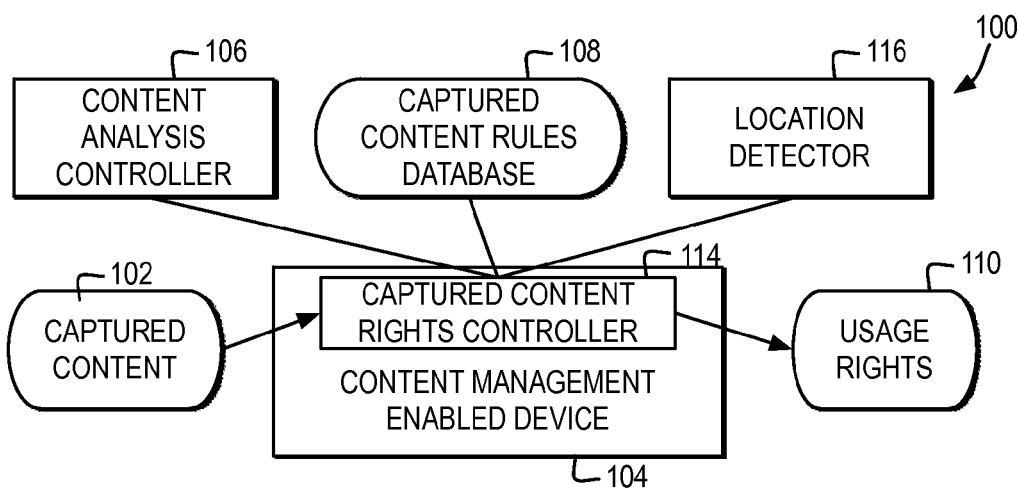
FIG. 1 is a block diagram depicting a digital rights management system for controlling captured content by a device enabled for captured content management.

With reference now to the Figures and in particular with reference now to FIG. 1, FIG. 1 depicts a block diagram of a digital rights management system for controlling captured content by a device enabled for digital rights management of captured content. In the example, content management system 100 controls digital rights management of captured content based on location. It is important to note that in additional or alternate embodiments, content management system 100 may include additional or alternate components and data to the components and data depicted and the components and data depicted may be located within a single computing system or distributed across one or more computing systems via a network or other communication or connection medium.

In the example, content management system 100 includes captured content 102 which may include elements that a content management enabled device 104 may need restrict from unauthorized use. In the example content management enabled device 104 is enabled to control digital rights management of captured content 102 through a captured content rights controller (CCRC) 114.

CCRC 114 detects captured content 102 at content management enabled device 104 and restricts use of captured content 102 until CCRC 114 determines whether all or any portion of captured content 102 includes elements which need to be protected against unauthorized use. In particular, CCRC 114 triggers content analysis controller 106 to analyze captured content 102 and identify one or more objects within captured content 102, which are the types of objects which may be subject to DRM rules within captured content rules database 108. Next, CCRC 114 compares the identified objects mappings for elements specified in captured content rules database 108 to determine any specific DRM rules applicable to the elements in captured content 102. In addition, a location detector 116 detects at least one location relevant to captured content 102, where the DRM rules for use of the identified elements in captured content 102 are further specified from captured content rules database 108 according to the detected relevant locations.

If CCRC 114 determines the specific DRM rights from captured content rules database 108 restrict use of captured content 102, then CCRC 114 releases captured content 102 for use in accordance with usage rights 110 which specify the DRM rights to captured content 102. "Use" or "usage" of captured content 102 as specified by usage rights 110, as described herein, may include restrictions on uses including, but not limited to, capturing, receiving, encrypting, accessing, transmitted, transferring, rendering, and outputting captured content 102.

In addition, CCRC 114 may determine that no portion of captured content 102 is subject to digital rights management for captured content and release captured content 102 with no usage rights 110 or with usage rights 110 certifying that captured content 102 has been analyzed and approved for any usage. In one example, when captured content 102 is not subject to digital rights management, usage rights 110 may include a signature or a watermark embedded in captured content 102 to certifying the identity of the system authorizing usage.

In the example, captured content 102 may include, but is not limited to, a video, photographic, or graphical image, other types of images and audio. Captured content 102 may include one or more elements in one or more portions that are restricted by DRM rules specified in captured content rules database 108. Captured content 102 may include, but is not limited to, content captured by another device, content captured by an application, content scanned from a printed image. In addition, while captured content 102 is described with reference to content which is captured or used by a user that is not the owner of the rights to the content, captured content 102 may also represent content which is distributed by an owner of the rights to the content, but captured independent of the distribution by the owner. Further, captured content 102 may include content that is not yet captured, but is capturable, such as the capturable content within the capture area of a camera device or the content displayed within a web page that is capturable by an application or copy function.

Content management enabled device 104 may represent the device that captures captured content 102, is able to capture captured content 102, receives captured content 102, transfers captured content 102, renders captured content 102, or transmits captured content 102. In addition, in the example, a content management enabled device 104 may represent an application that receives captured content 102, a web service that accesses or delivers captured content 102, or other program, process, or executable that executes on a computing system.

Content analysis controller 106 represents one or more types of content analysis systems. In particular one or more combined or separate content analysis systems may analyze captured content 102 to detect and identify objects which may represent content subject to digital rights management protection including, but not limited to, a person or object, a gesture type, a voice identity, a lyrical composition, and protected marks including, but not limited to, a trademarked image, copyrighted material, monetary images, and images marking content as confidential. As each system implemented as content analysis controller 106 detects and identifies one or more objects in one or more portions of captured content 102, other systems may access the identified objects to detect and identify additional objects in additional portions of captured content 102 or further specify the identified objects within captured content 102. In identifying objects, content analysis controller 106 may perform additional levels of identification, such as facial recognition to identify a person, voice recognition to identify a person or song, and other types of identity recognition.

Although not depicted, content analysis controller 106 may access one or more object databases with mappings and other specifications of different types of objects for use in detecting and identifying objects within captured content 102. In addition, as each system implemented as content analysis controller 106 detects and identifies one or more objects within one or more portions of captured content 102, content analysis controller 106 may access captured content rules database 108 to detect and identify objects which may match restricted elements defined within captured content rules database 108.

In one example, to detect a person or thing and also identify an identity of a particular person or thing, content analysis controller 106 may comprise one or more of a photo or video recognition system for recognizing objects representing people or things within images of captured content 102, converting what is recognized in the image into tags, and looking for other images that are similarly tagged to identify a person, thing, or other type of content, such as looking for similarly tagged images in captured content rules database 108 or another database.

In another example, to detect and identify a particular gesture, content analysis controller 106 may comprise one or more of a gesture detection system for identifying three-dimensional objects within images of captured content 102, comparing the three-dimensional objects with definitions for gestures, and looking for specifications for the gestures in captured content rules database 108 or another database, where the gestures may be further specified as belonging to a particular person by the image recognition system. A gesture may include a dynamic gesture, such as a performance art, motion, technique, or expression, or a static gesture.

In yet another example, to detect and identify a particular voice, lyrical composition, or other audio composition, content analysis controller 106 may comprise a voice recognition system for sampling a voice, analyzing the characteristics of the voice, and identifying a speaker with the same characteristics as the characteristics of the analyzed voice sample within captured content 102. In another example, content analysis controller 106 may comprise other audio recognition system for sampling music or other audio content from captured content 102, analyzing the characteristics of the sampled music or other audio content, and identifying a musical composition with similar characteristics to the characteristics analyzed in the sampled music or other audio content. In identifying audio within captured content 102, content analysis controller 106 may identify audio at a base level, including identifying notes, instruments, and voices, where different usage rights may apply to each note, instrument or voice.

In another example, to detect and identify a protected mark, content analysis controller 106 may comprise a mark recognition system for scanning captured content 102, identifying shapes, colors, patterns, inks, and other distinguishing textual or graphical characteristics of the scan, comparing the identified textual and graphical characteristics of the scan and looking for specifications identifying the origin of the textual and graphical characteristics in captured content rules database 108 or other databases. For example, a mark recognition system may detect a trademark within scanned content or may detect an attempt to copy a monetary image or image marked as confidential.

Captured content rules database 108 may include mappings, definitions, and other specifications for identifying particular elements and the rules for managing licensed usage of the elements when detected within captured content. In addition, captured content rules database 108 may include encryption keys or other types of keys, which can be released to CCRC 114 for authorizing use of managed elements within captured content.

Rules for managing licensed usage of the elements within captured content may include multiple types of parameters and criteria for establishing usage rights, licensing cost, and other restrictions. In particular, rules for managing license usage of the elements within captured content may be further constrained based on additional data, such as locations relevant to usage of captured content 102 as detected by location detector 116. For example, the level of authorized usage of captured content 102 allowed in usage rights 110 may increase as the distance increases between the original location of the restricted element captured in captured content 102 and the captured location of captured content 102. In another example, usage rights 110 may vary based for restricted elements if the restricted element was captured from a website versus if the restricted element was captured in photographic image or live audio recording. As previously noted, restrictions on use of captured content 102 may include, but is not limited to, restrictions on capturing, receiving, transmitting, transferring, rendering, or outputting content 102.

Location detector 116 detects locations relevant to or associated with captured content 102 including, but not limited to, the location that captured content 102 is captured, the original location of the restricted image or audio elements captured in captured content 102, the location that captured content 102 is to be transferred to or from, or the location that captured content 102 is to be output or rendered. A location may include, but is not limited to, a physical location, a context, a time zone, a network location, or a data storage location.

For example, location detector 116 may implement a GPS detection system, a mapping function, or other systems that enable location detector 116 to detect a physical location of the image or audio elements captured within captured content 102, to detect a physical location of content management enabled device 104 when capturing captured content 102, or to detect other physical locations relevant to captured content 102. In addition, location detector 116 may perform analysis of the characteristics of an element within captured content 102 to approximate the distortions in the captured image or audio elements in captured content 102 based on a physical distance between the captured image or audio elements and the device capturing the image or audio elements.

In addition, location detector 116 may implement network based services, such as web crawlers, search engines, and databases which are able to detect the original network location of the image or audio elements captured in captured content 102, to detect the current network location of captured content 102, to detect the location of the web interface in which captured content 102 is to be rendered or output, or to detect other network or computer storage location based information relevant to captured content 102.

CCRC 114, in applying usage rights 110, may automatically restrict or authorize use of captured content 102, may offer a user options to adjust usage rights 110, may offer a user options to adjust captured content 102, or may provide other options. Examples of application of usage rights 110 of CCRC 114 include, but are not limited to, certifying the authorized usage of captured content 102, adjusting the graphical output by blurring or blocking unauthorized elements within captured content 102, requesting authorization to increase usage rights 110 from the owner of the rights to restricted elements in captured content 102, or canceling the usage of captured content 102.

In particular, in one example of CCRC 114 applying usage rights 110, CCRC 114 may facilitate a user purchase of a license to adjust the level of authorization of usage of elements when used within captured content 102 as specified in usage rights 110. For example, CCRC 114 may facilitate user purchase of a license to access rights to use a trademark image or rights to access an authorized image of a trademark image from the trademark rights holder to replace a captured version of the trademark image in captured content 102.

In one example, a license may vary based on a skill rating or other type of rating of the user capturing the captured content 102. In addition, in another example, the license may vary based on the percentage of the total restricted element showing in captured content 102. Further, a license may vary based on the number of intended views, prints, or other output static of captured content 102.

In another example, in applying usage rights 110, CCRC 114 may trigger a public relations service that receives captured content 102 and requires authorization for use of captured content 102 by a public relations professional, attorney, or other authority for determining whether to allow use of captured content 102.

CCRC 114 may also provide a service for blocking, from captured content 102, those portions of captured content 102 including restricted elements the user is not granted access to within usage rights 110. In one example, CCRC 114 may apply a filter to captured content 102 to apply a selectable image to those portions of captured content 102 that a user is restricted from using, where the user may select the selectable images to trigger CCRC 114 to access licensing rights to the restricted elements within the blocked portions.

While in the embodiment content analysis controller 106, captured content rules database 108 and location detector 116 are illustrated as separate components from CCRC 114, in additional or alternate embodiments one or more of content analysis controller 106, captured content rules database 108 and location detector 116 may be implemented by CCRC 114 or within content management enabled device 104.

Figure 2:
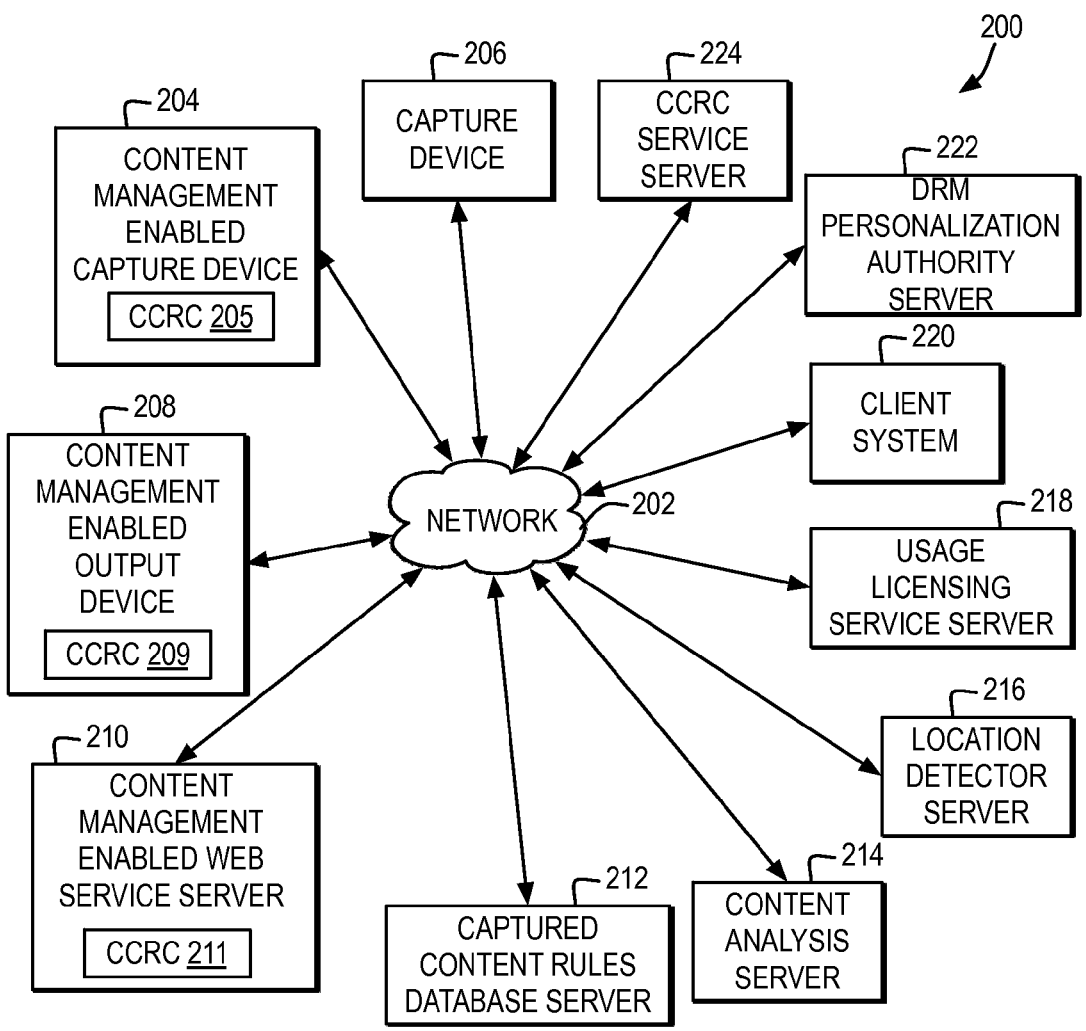
FIG. 2 is a block diagram depicting one example of a network environment in which one or more content management enabled devices control digital rights management for captured content.

With reference now to FIG. 2, a block diagram illustrates one example of a network environment in which one or more content management enabled devices control digital rights management for captured content. It is important to note that network environment 200 is illustrative of one type of network environment that may support one or more types of content management enabled devices, however, devices, client systems, server systems, and other components of a system for supporting content management of captured content may be implemented in other network environments. In addition, it is important to note that the distribution of systems within network environment 200 is illustrative of distribution of systems, however, other distributions of systems within a network environment may be implemented.

As illustrated, multiple systems within network environment 200 may be communicatively connected via network 202, which is the medium used to provide communication links between various devices and computer system communicatively connected. Network 202 may include permanent connections such as wire or fiber optics cables and temporary connections made through telephone connections and wireless transmission connections, for example. Network 202 may represent one or more of packet-switching based networks and telephony based networks, local area and wire area networks, public and private networks.

Network 202 may implement one or more layers of one or more types of network protocol stacks, which may include one or more of a physical layer, a link layer, a network layer, a transport layer, a presentation layer, and an application layer. For example, network 202 may implement one or more of the Transmission Control Protocol/Internet Protocol (TCP/IP) protocol stack or an Open Systems Interconnection (OSI) protocol stack. In addition, for example, network 202 may represent the worldwide collection of networks and gateways that use the TCP/IP suite of protocols to communicate with one another. In other examples, network 202 may implement one or more different types of protocol stacks and other types of protocol stacks.

Network environment 200 may implement multiple types of network architectures. In one example, network environment 200 may be implemented using a client/server architecture, where computing systems requesting data or processes are referred to as clients and computing systems processing data requests and processes are referred to as servers. In the embodiment, as illustrated, one or more systems communicatively connected via network 202 may function as client systems or server systems. In another example, network environment 200 may be implemented in a peer-to-peer network architecture. In yet another example, network environment 200 may be implemented in a grid architecture. It will be understood that other types of network architectures and combinations of network architectures may be implemented in network environment 200.

In one example, network environment 200 may include both a capture device 206 and a content management enabled capture device 204. Both capture device 206 and content management enabled capture device 204 may capture content and distribute the captured content over network 202. Content management enabled captured device 204 is an example of content management enabled device 104 enabled to control digital rights management for captured content through a CCRC 205. In the example, content management enabled capture device 204, based on determined usage rights for restricted elements within the captured content, may, in one example, perform one or more of, blocking capture of the content, automatically deleting captured content, automatically encrypting captured content, or embedding or affixing the determined usage rights to the captured content for distribution of the captured content over network 202.

Capture device 206 may also be enabled to control digital rights management for captured content through accessing a CCRC service server 224 which provides a CCRC service or a downloadable instance of CCRC 114 to other systems via network 202. In addition or alternatively, other devices within network environment 200 receiving the captured content or detecting capture device 206 when communicatively connected to network 202, may control the digital rights management of any captured content by capture device 206.

In another example, network environment 200 may include a content management enabled output device 208. Content management enabled output device 208 is an example of content management enabled device 104 enabled to control digital rights management for captured content through CCRC 209. In one example, content management enabled output device 208 may be implemented through an application which controls digital rights management of captured content. In another example, content management enabled output device 208 may be implemented through an output interface that controls rendering of captured image content or play of captured audio content, for example. In one example, content management enabled output device 208 may receive captured content which already includes usage rights, such as usage rights managed captured content from content management enabled capture device 204. In addition, content management enabled output device 208 may receive unmanaged captured content, such as captured content from capture device 206. Whether the captured content includes usage rights or not, content management enabled output device 208 may determine what usage rights apply to the captured content for output by content management enabled output device 208. In addition, if received captured content includes usage rights, content management enabled output device 208 may apply the specified usage rights.

In yet another example, network environment 200 may include a content management enabled web service server 210. Content management enabled web service server 210 is an example of content management enabled device 104 enabled to control digital rights management for captured content through CCRC 211. Content management enabled web service server 210 may provide one or more types of services which allow users, such as a user at client system 220 through a browser, to access, download, or stream captured content from content management enabled web service server 210 or upload or store captured content at content management enabled web service server 210. Examples of services provided by content management enabled web service server 210 may include, but are not limited to, a search engine service, a social networking service, an image repository service, or a video repository service. Content management enabled web service server 210 may, for example, block a user from uploading captured content based on usage rights for the captured content, may block the portions of captured content which are restricted based on usage rights from upload, download, or other output, or may adjust the output of search results that include captured content based on the usage rights of the captured content.

Any of CCRC 205, CCRC 209, CCRC 211, and CCRC service server 224, in determining what usage rights apply to captured content, may locally implement one or more of content analysis controller 106, captured content rules database 108, and location detector 116. In addition, or alternatively, any of CCRC 205, CCRC 209, CCRC 211, and CCRC service server 224, in determining what usage rights apply to captured content, may access content analysis controller 106 from content analysis server 214, may access captured content rules database 108 from captured content rules database server 212, or may access location detector 116 from a location detection server 216. Further, network environment 200 may include additional or alternate systems that collectively represent content management system 100.

In addition, as illustrated, for facilitating licensing of usage rights for content, any of CCRC 205, CCRC 209, CCRC 211, and CCRC service server 224 may access a usage licensing service server 218 for negotiating rights to captured content or to the elements within the captured content. In one example, usage licensing service server 218 may facilitate communication and financial transactions between the user requesting access to captured content and the owner or a representative of the owner of the rights to the restricted element in the captured content. In another example, usage licensing service server 218 may apply automated rules or polices in selecting whether to grant a license and in selecting a cost of a license for a particular request.

A DRM personalization authority server 222 provides an interface through which a user may personalize preferences, authorization rules, licensing rules, and other instructions with regard to the content that a user owns the rights to restrict. In addition, DRM personalization authority server 222 provides an interface through which a user may upload, record, store, or otherwise provide examples of elements, which can be captured as captured content 102, that the user owns the rights to restrict. In one example, a user at client system 220, through a browser, may access the personalization interface of DRM personalization authority server 222. In another example, other systems, through other types of applications, such as image editing applications, financial transaction applications, and network communication applications, may access the personalization interface of DRM personalization authority server 222.

DRM personalization authority server 222 may update one or more of captured content rules database server 212, usage licensing service server 218, content analysis server 214, CCRC 205, CCRC 209, CCRC 211, CCRC service server 224, or other systems registered to receive updates responsive to user personalization of DRM rules for content. In addition, systems may periodically request updates on managed content and DRM rules for managed content from DRM content personalization service server 222.

In addition, DRM personalization authority server 222 may provide an interface through which a user may set up a user profile and may personalize usage characteristics. For example, a user may set up a user name and password, transaction account information, profession, intended use of captured content and other information relevant to the usage rights that the user may receive for captured content owned by someone who did not capture the content. In one example, a user profile may identify that the user has a blog and posts captured images on the blog, to trigger specification of usage rights 110 for blog use.

Further, DRM personalization authority server 222 may provide an enforcement authority service for receiving indicators of fraudulent usage, fraudulent certifications, or other unauthorized access or use by users, websites, or other entities regarding elements within captured content which is owned by registered users of DRM personalization authority server 222. DRM personalization authority server 222 may update a user profile with unauthorized usage indicators and may permit an owner of rights to elements within captured content to set rules that include restrictions based on the unauthorized usage indicators in a requesting user profile.

Figure 3:
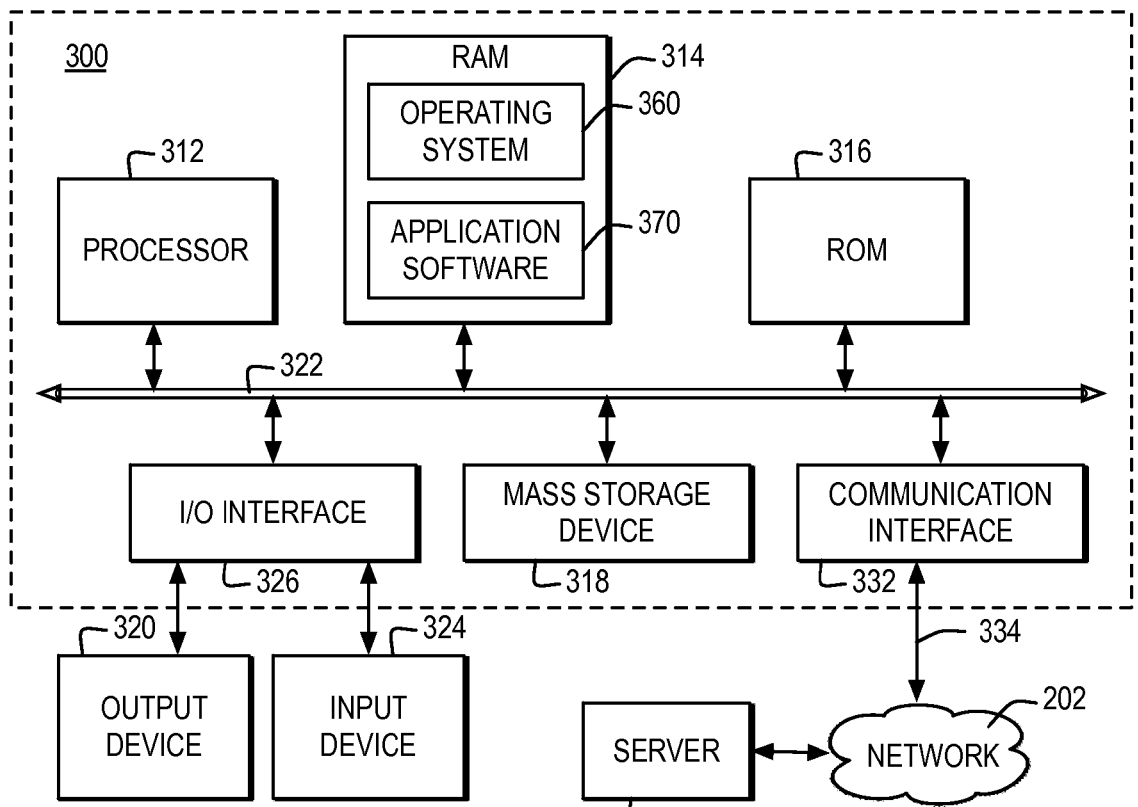
FIG. 3 is a block diagram depicting one embodiment of a computer system in which the present invention may be implemented.

With reference now to FIG. 3, a block diagram illustrates one embodiment of a computer system in which the present invention may be implemented. The processes, methods, computer program products, and systems of the present invention may be executed in a variety of systems, including a variety of computing systems, such as computer system 300, communicatively connected to a network, such as network 302.

Computer system 300 includes a bus 322 or other communication device for communicating information within computer system 300, and at least one processing device such as processor 312, coupled to bus 322 for processing information. Bus 322 includes low-latency and higher latency paths that are connected by bridges and adapters and controlled within computer system 300 by multiple bus controllers. When implemented as a server, computer system 300 may include multiple processors designed to improve network servicing power. Where multiple processors share bus 322, an additional controller (not depicted) for managing bus access and locks may be implemented.

Processor 312 may be a general-purpose processor such as IBM's PowerPC™ processor that, during normal operation, processes data under the control of an operating system 360, application software 370, middleware (not depicted), and other code accessible from a dynamic storage device such as random access memory (RAM) 314, a static storage device such as Read Only Memory (ROM) 316, a data storage device, such as mass storage device 318, or other data storage medium. Operating system 360, application software 370, or other layers of software may implement the functions performed by a captured content rights controller and by other systems and devices throughout, such as the functions performed by systems and devices described with reference to FIGS. 1 and 2.

Figure 9:
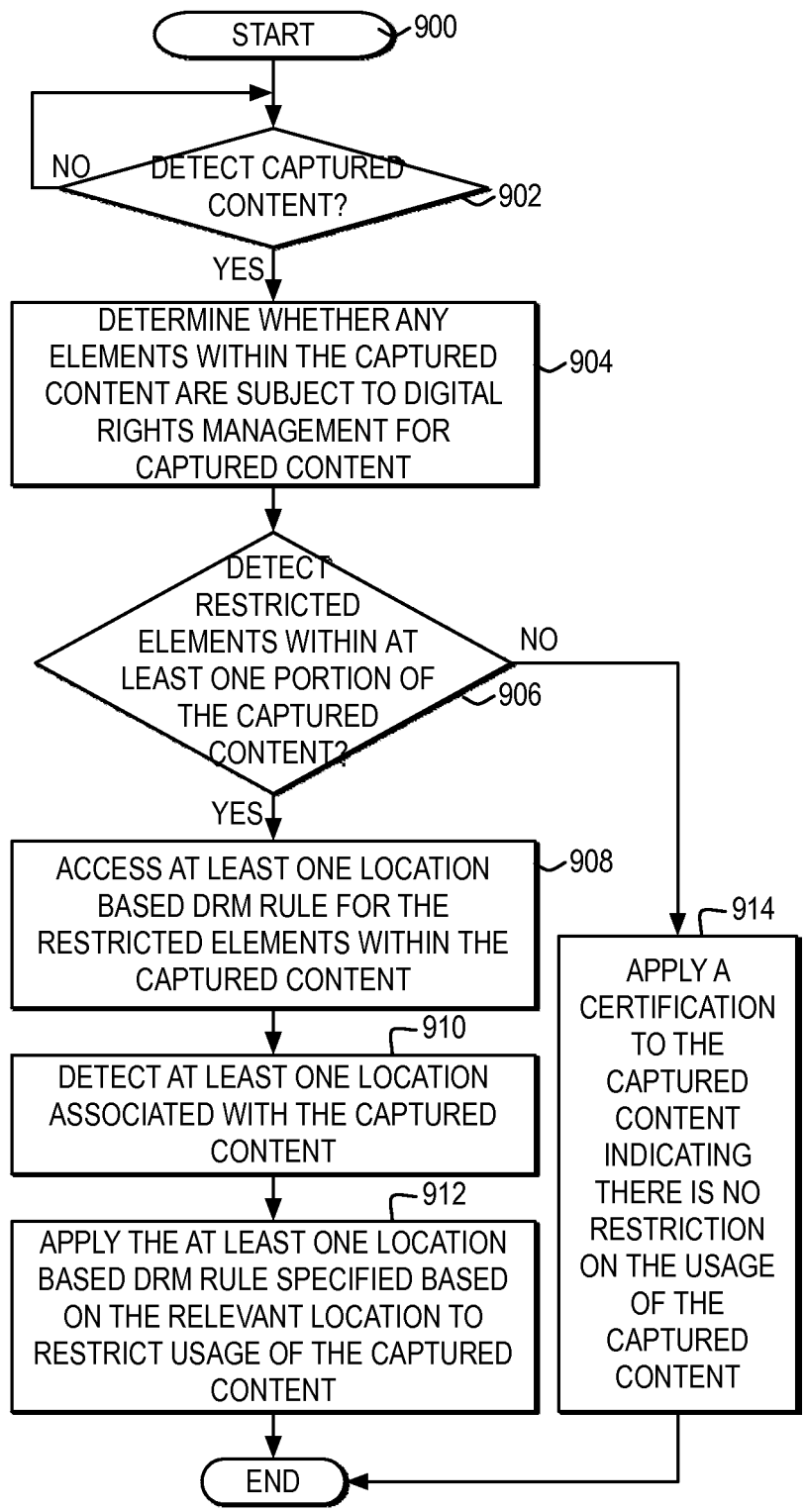
FIG. 9 is a high level logic flowchart illustrating a process and program for digital rights management of captured content.
Figure 10:
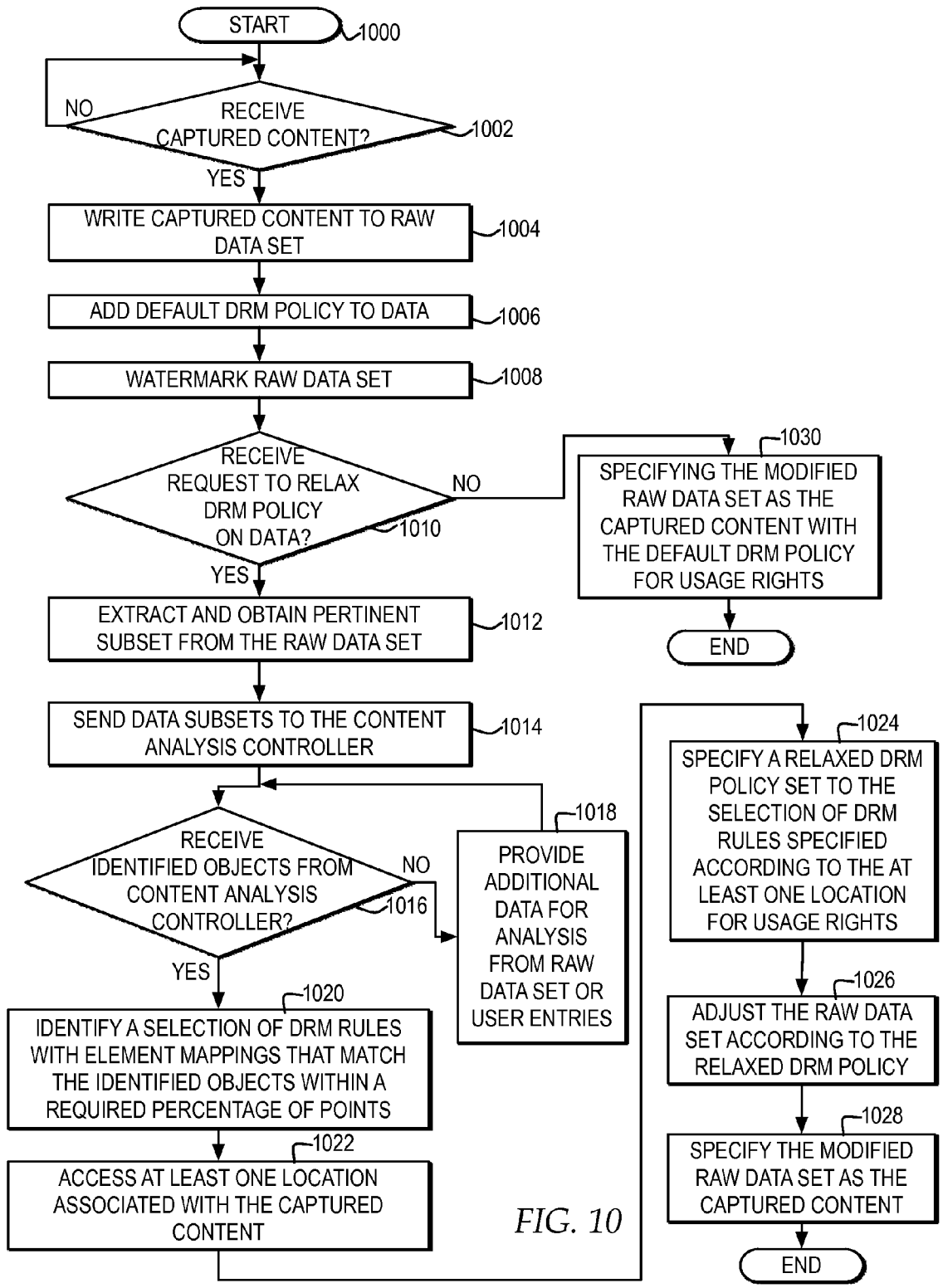
FIG. 10 is a high level logic flowchart depicting a process and program for determining usage rights for controlling digital rights management of captured content.

In one embodiment, the operations performed by processor 312 may control digital rights management of captured content as described in the operations of the flowcharts of FIGS. 9 and 10 and other operations described herein. Operations performed by processor 312 may be requested by operating system 360, application software 370, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 300 cause computer system 300 to perform a process according to the present invention. The terms "computer-readable medium" or "machine-readable medium" as used herein includes any medium that participates in providing instructions to processor 312 or other components of computer system 300 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 300 can read and which is suitable for storing instructions. In the present embodiment, an example of a non-volatile medium is mass storage device 318, which as depicted is an internal component of computer system 300, but will be understood to also be provided by an external device. Volatile media include dynamic memory such as RAM 314. Transmission media include coaxial cables, copper wire or fiber optics, including the wires that comprise bus 322. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 340 to requesting computer system 300 by way of data signals embodied in a carrier wave or other propagation medium via network 202 to a network link 334 (e.g. a modem or network connection) to a communications interface 332 coupled to bus 322. In one example, where processor 312 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 332 provides a two-way data communications coupling to network link 334 that may be connected, for example, to a local area network (LAN), wide area network (WAN), or directly to an Internet Service Provider (ISP). In particular, network link 334 may provide wired and/or wireless network communications to one or more networks, such as network 202. Further, although not depicted, communication interface 332 may include software, such as device drivers, hardware, such as adapters, and other controllers that enable communication. When implemented as a server, computer system 300 may include multiple communication interfaces accessible via multiple peripheral component interconnect (PCI) bus bridges connected to an input/output controller, for example. In this manner, computer system 300 allows connections to multiple clients via multiple separate ports and each port may also support multiple connections to multiple clients.

Network link 334 and network 202 both use electrical, electromagnetic, or optical signals that carry digital data streams. The signals through the various networks and the signals on network link 334 and through communication interface 332, which carry the digital data to and from computer system 300, may be forms of carrier waves transporting the information.

In addition, computer system 300 may include multiple peripheral components that facilitate input and output. These peripheral components are connected to multiple controllers, adapters, and expansion slots, such as input/output (I/O) interface 326, coupled to one of the multiple levels of bus 322. Input device 324 may include, for example, a microphone, a photo capture system, a video capture device, a body scanning system, a keyboard, a mouse, or other input peripheral device, communicatively enabled on bus 322 via I/O interface 326 controlling inputs. In addition, an output device 320 communicatively enabled on bus 322 via I/O interface 326 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 3 may vary. Furthermore, those of ordinary skill in the art will appreciate that the depicted example is not meant to imply architectural limitations with respect to the present invention. For example, computer system 300 may also be a tablet computer, laptop computer, or telephone device.

Figure 4:
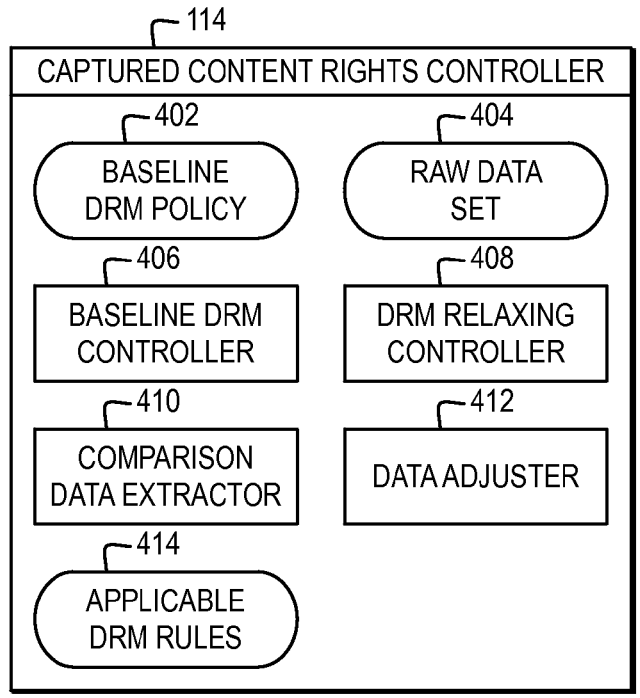
FIG. 4 is a block diagram depicting one example of components of a captured content rights controller (CCRC)

With reference now to FIG. 4, a block diagram illustrates one example of components of a captured content rights controller. It is important to note that additional or alternate components, to the components depicted may be implemented within or by CCRC 114. In addition, it is important to note that components illustrated with reference to CCRC 114 may also be implemented by content analysis controller 106 or location detector 116 as described in FIG. 1 and may be distributed across one or more systems communicatively connected via network 202, as described with reference to FIG. 2.

Although not depicted, CCRC 114 may include a capturing controller or a receiving controller for capturing or accessing captured content 102. Alternatively, a device or system that is content management enabled by running CCRC 114 may include a capturing controller or an access controller for capturing or receiving captured content 102.

In the example, CCRC 114 implements a baseline DRM controller 406 for detecting captured content 102 which may need to be protected against unauthorized use. Baseline DRM controller 406 may include conversion applications for converting captured content 102 from one format of data into another format of data. In addition, DRM controller 406 may buffer or cache captured content 102.

In one example, baseline DRM controller 406 writes captured content 102 into a raw data set 404 of encrypted data that is only accessible by applications that can authenticate with a trusted root key. For example, the one or more applications that may authenticate using the trusted root key may include, but are not limited to, an application that erases data from the buffers or caches of content management enabled device 104, a comparison data extractor 410, and baseline DRM controller 406. Raw data set 404 may also include additional information about captured content 102, including, but not limited to, the date, time, and location where the content was captured, identification information provided when the content was captured, and other data available to content management enabled device 104 related to the captured content and the environment in which the content was captured.

In addition, in one example, baseline DRM controller 406 may apply a baseline DRM policy 402 to raw data set 404. Baseline DRM policy 402 may specify generic usage rights for a particular user, for a service, or for other entities. In addition, baseline DRM policy 402 may be further specified according to additional criteria, including, for example, but not limited to, location, time of day, and quality of the captured content.

Further, in one example, baseline DRM controller 406 may apply a digital watermark to raw data set 404 at one or more different times. In one example, the digital watermark may include an identifier for CCRC 114, content management enabled device 108 or other identifier that marks the origin of raw data set 404 or marks the origin of the analysis of raw data set 404 to determine what usage rights are available.

Next, CCRC 114 implements a comparison data extractor 410 for extracting one or more subsets of data from raw data set 404 that may be analyzed by content analysis controller 106. In one example, each subset of data may represent a layer of data, where captured content 102 includes multiple image layers or sounds layers. In another example, comparison data extractor 410 may analyze raw data set 404 for data objects representative of people, objects, gestures, or marks and extract each type of data object into a separate subset of data for analysis by content analysis controller 106.

In one example, content analysis controller 106 may determine that one or more of the data subsets extracted by comparison data extractor 410 do not include sufficient detail to provide an identification from the data subsets. Content analysis controller 106 may request that comparison data extractor 410 provide a more detailed data subset and comparison data extractor 410 may extract additional data points from raw data set 404 and send the updated data subset to content analysis controller 106. Content analysis controller 106 may also request a person to review the data subsets and provide additional context information for the data subsets.

In addition, CCRC 114 implements a DRM relaxing controller 408 for receiving one or more identified elements within the one or more data subsets from content analysis controller 106 and comparing the identified elements with rules in captured content rules database 108 to determine if there are DRM rules and policies for the elements detected within captured content 102. Applicable DRM rules 414 represent a selection of one or more rules from captured content rules database 108 which apply to the elements detected within raw data set 404, and which are incorporated into usage rights 110.

DRM relaxing controller 408 also receives location information from location detector 116, indicating one or more locations associated with capture of the captured content. In particular, applicable DRM rules 414 includes rules which determine a level of authorization for usage of restricted elements within captured content based on one or more of a location of capture of the captured content, a distance between the location of the captured content and device capturing the content, a location that the captured content will be used, and other location based criteria.

Figure 6:
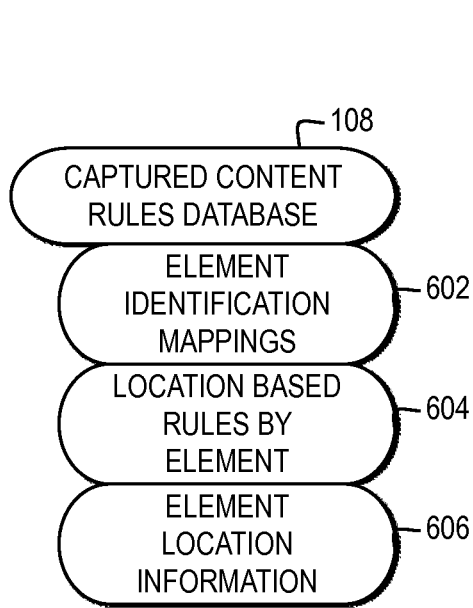
FIG. 6 is a block diagram depicting one example of entries in a captured content rules database for setting DRM rules for restricting access to captured content.

In particular, with reference now to FIG. 6, a block diagram illustrates examples of data entries within captured content rules database 108. In the example, captured content rules database 108 may include element identification mappings 602, where content analysis controller 106 may return an object mapping to CCRC 114 and where DRM relaxing controller 408 compares the object mapping to element identification mappings 602 to identify the elements most closely matching the mapped objects. For example, content analysis controller 106 may return object mappings for a nose, eyes, mouth, and chin, identified from raw data set 404 and DRM relaxing controller 408 compares the object mappings within nose, eye, mouth, and chin mappings in element identification mappings 602 to identify one or more people whose records in element identification mappings 602 match the mapped objects. In another example, content analysis controller 106 may access element identification mappings 602 and match object mappings to element mappings.

In addition, in particular, with reference to FIG. 6, DRM relaxing controller 106 may access the location information for captured content or additional location information about elements detected within captured content or that should be detected within captured content from element location information 606. For example, element location information 606 may indicate, based on a calendar or other information provided by a person to DRM personalization authority server 222, the location that a person should be located at a particular time or date, such that DRM relaxing controller 408 may further filter element identification mappings 602 to mappings of persons most likely to be included within a capture area based on the predicted or actual location of those persons. In another example, element location information 606 may include architectural, topographical, or other maps specifying the information that is outside the capture area of a camera or outside the captured area of content already captured from a particular location, to provide context for the location when DRM relaxing controller 408 determines usage rights 110.

Location based rules by element 604 include rules for restricting use of elements within captured content based on location and may include one or more additional criteria. In one example, an owner of or authority over a location may specify one or more of the rules within location based rules by element 604, such as setting location based rules by element for blocking capture of images by travelers or visitors within a secured area. For example, a government may set location based rules by element for limiting capturing of images within a secured customs area, within a museum with light sensitive artwork, or within a tourist area where tariffs may be charged for capturing images on a holiday or during particular times of day. In another example, the owner of the element may specify one or more rules within location based rules by element 604. In addition, other users, authorities, entities, employers, financers, and organizations may specify one or more rules based on location, and other criteria, within location based rules by element 604.

By analyzing applicable DRM rules 414 according to locations, user identity, identity of the system executing CCRC 114, and other criteria specified within applicable DRM rules 414, DRM relaxing controller 408 determines whether usage rights 110 should include one or more of each rule within baseline DRM policy 402 and the relaxed set of applicable DRM rules 414. In particular, in determining which of applicable DRM rules 414 apply and how the rules apply within usage rights 110, DRM relaxing controller 408 may apply rules based on the position within a hierarchy of authorities of the person setting the rule.

In one example, DRM relaxing controller 408 may embed or affix usage rights 110 to captured content 102, may pass usage rights 110 to data adjuster 412 for enforcement, or may separately transmit usage rights 110 for enforcement by other CCRCs. In addition, DRM relaxing controller 408 may output usage rights 110 in a textual, graphical, audio, or video interface and provide a user with a selectable option to request to adjust the level of authorization provided to the user for captured content 102 in usage rights 110. In one example, responsive to a user request to adjust the level of authorization provided to the user for captured content 102, DRM relaxing controller 408 may access usage licensing service server 218 to coordinate the acquisition of an additional license for the requested level of authorization.

Further, DRM relaxing controller 408 may output usage rights 110 and may output descriptions of the identified elements with captured content 102 with a selectable option for a user to certify that captured content 102 does not include the identified elements or to protest or contest the restriction upon use of the identified element within captured content. For example, DRM relaxing controller 408 may receive identified elements from content analysis controller 106 identifying captured content 102 as including an image of a musician who has set managed content rules through DRM content personalization service server 222 to restrict capture of images of the musician within a particular distance of a stage at a concert. In the example, DRM relaxing controller 408 provides the user with an option to certify that captured content 102 does not include an image of the musician.

By the user certifying that captured content 102 does not include the musician identified by content analysis controller 106, DRM relaxing controller 408 embeds a certification by the user that captured content 102 does not include the identified image. In addition, DRM relaxing controller 408 may transmit the content with the certification to DRM content personalization service server 222 or usage licensing service server 218 for further monitoring. Further, DRM relaxing controller 408 at any device enabled with policy based rights controller 114 may enforce the certification or detect unauthorized use of the certification by monitoring other information associated with captured content 102 within a display area, such as with captions or other content associated with captured content 102, to determine whether the user later associated captured content 102 with the originally identification of captured content 102. For example, if CCRC 211 of content management enabled web service server 210 detects the user upload captured content 102 and tag captured content 102 with the name of the musician originally identified by content analysis controller 106, then CCRC 211 may block use of captured content 102 or report the certification discrepancy to DRM content personalization service server 222 or other services for monitoring content usage.

CCRC 114 also includes a data adjuster 412. Data adjuster 412 may adjust raw data set 404 and output the adjusted raw data set 404 as update captured content 102 with adjusted raw data set 404. In one example, data adjuster 412 may cancel, blur, or distort all or portions of raw data set 404. In another example, depending on the DRM rules finally determined by DRM relaxing controller 408, data adjuster 412, in response to the DRM rules not allowing usage of all or a portion of captured content 102, may erase all or portions of raw data set 404 and captured content 102 from any buffers or caches holding all or portions of raw data set 404 and captured content 102.

Figure 5:
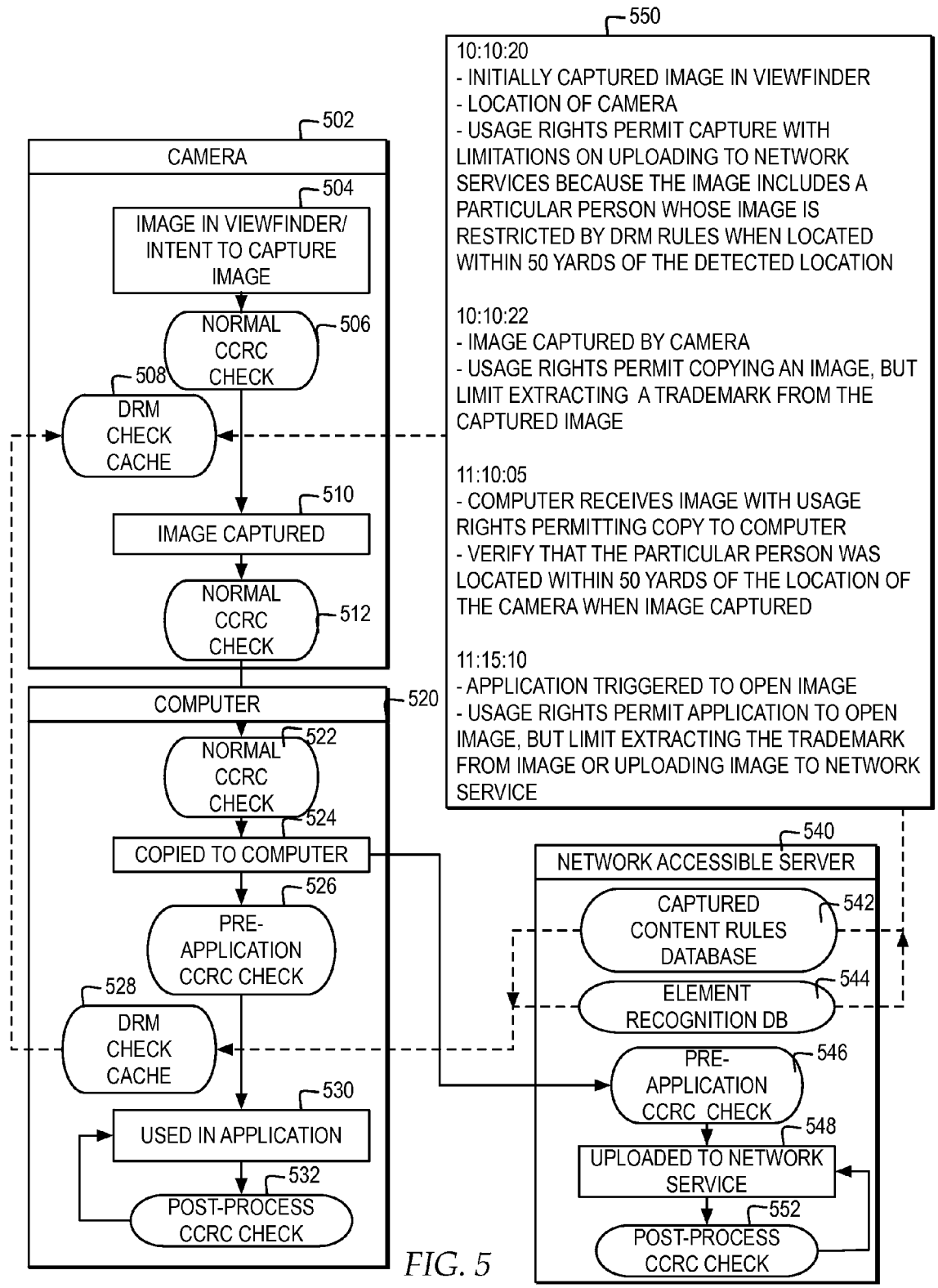
FIG. 5 is a block diagram depicting one example of a content management enabled camera, a content management enabled computer, and a content management enabled network accessible system, for restricting use of captured content subject to digital rights management protection.

Referring now to FIG. 5, a block diagram illustrates one example of a content management enabled camera, a content management enabled computer, and a content management enabled network accessible system, for restricting captured content. In the example, multiple instances of CCRC 114 are illustrated as triggered at different points in time within different systems, as represented by normal CCRC check 506, normal CCRC check 512, normal CCRC check 522, pre-application CCRC check 526, pre-application CCRC check 546, post-process CCRC check 532, and post-process CCRC check 550. It is important to note that in additional or alternate embodiments, additional instances of CCRC 114 may be triggered or only selections of the instances of CCRC 114 illustrated may be triggered.

A log 550 represents an example of a portion of a log file attached to the captured content for certifying the analysis and restriction performed by each of the instances of CCRC 114. It will be understood that log 550 is depicted for purposes of illustrating the flow of captured content through multiple CCRC check points and that log 550 may include additional or alternate entries and may include additional or alternate types of information.

In the example, a camera 502 is able to capture images including, but not limited to, still images and video images. Camera 502 may include additional functions to enable capture of three-dimensional images. In addition, camera 502 may capture audio, scan an image, or perform other types of image capture.

In particular, in the example, as illustrated at reference numeral 504, camera 502 may include a viewfinder that pre-captures an image within a capture area of camera 504 or camera 504 may receive input that a user intends to capture an image within the view of the capture area of camera 502. For example, to receive input that a user intends to capture an image within the view of the capture area of camera 502, camera 502 may implement a trigger that a user presses or touches in one position to trigger an auto-focus feature. The pre-captured image in the viewfinder or the image a user indicates an intention to capture may represent captured content 102.

Responsive to detecting an image in a viewfinder or detecting an intent to capture an image at reference numeral 504, normal CCRC check 506 is triggered. Normal CCRC check 506 may determine the elements within the image, determine usage rights for the identified elements, such as usage rights 110. If the usage rights indicate that capture of the image is restricted, normal CCRC check 506 may perform one or more of blurring unauthorized elements within the viewfinder, obtaining or purchasing additional usage rights to the elements in the image to be captured, permitting the user to certify that the image to be captured does not contain the unauthorized elements identified by normal CCRC check 506, blocking, canceling or disallowing image capture of the element, setting the image to be auto-encrypted if captured until additional usage rights can be accessed, or setting the image to be automatically deleted if the user selects to capture the image. In one example, data adjuster 412 may block the functionality of camera 502 to prohibit image capture or may adjust the capturable image within a viewfinder according to usage rights determined by normal CCRC check 506.

If normal CCRC check 506 allows the user to capture an image, then when the image is captured, as illustrated at reference numeral 510, a normal CCRC check 512 is triggered to restrict usage of the captured image. The image captured by camera 502 at reference numeral 510 may represent captured content 102.

Responsive to detecting the image captured at reference numeral 510, an instance of CCRC 114 is triggered as illustrated by normal CCRC check 512 to determine whether use of the image captured at reference numeral 510 is in compliance with previously determined usage rights by normal CCRC 506 and whether additional usage rights apply to usage of the image captured at reference numeral 510. In addition, normal CCRC check 512 may be triggered if camera 502 transmits or stores the image captured at reference numeral 510, to determine whether additional usage rights should be embedded or attached to the image captured at reference numeral 510 when distributed to other systems or stored in another data storage location.

In particular, normal CCRC check 512 applies any usage rights already determined and may determine whether additional usage rights apply. If usage of the captured image is restricted by the determined usage rights, normal CCRC check 512 may perform one or more of blurring unauthorized element in the image, obtaining or purchasing additional usage rights to the elements in the captured image, permitting the user to certify that the captured image does not contain unauthorized elements identified by normal CCRC check 512, blocking, canceling, or deleting the captured image, or auto-encrypting the captured image until rights to use of unauthorized elements within the image can be obtained. In one example, responsive to the determined usage rights for the captured image, data adjuster 412 may block the functionality of camera 502 from allowing a user to view, store, or transmit the captured image or may automatically delete the captured image from the cache, buffers, or other storage systems of camera 502.

In the example, normal CCRC check 506 and normal CCRC check 512 may access DRM check cache 508 which may include element identification mappings, location based rules by element, and other data accessed from captured content rules database 542 from network accessible server 540. In addition, DRM check cache 508 may also include records accessed from a separate element recognition DB 544 with additional or alternate descriptions for one or more elements, such as people and trademark images. For example, DRM check cache 508 may access records from element recognition DB 544 which allow identification of a larger number of elements, some of which may include additional mappings in captured content rules database 542. Camera 502 may implement content analysis controller 106 locally or access a content analysis server service, such as from content analysis server 214 via network 202.

In particular, DRM check cache 508 may be initially specified with element mappings or element recognition records that are reduced in resolution and size, since the storage size of DRM check cache 508 may be small. In addition, the records in DRM check cache 508 may be further specified for a particular location, event, or other environment. In one example, DRM personalization authority server 222 may have access to the locations of registered owners of rights to images, such as through receiving updates from a GPS sensor tracking an owner location, through accessing a calendar of an owner, or through other received information indicating an owner's location. DRM personalization authority server 222 may specify the captured content rules database 542 and element recognition database (DB) 544 for a location, event or other environment to include location based element rules, element mappings, and element recognition records most relevant to a particular location, event or other environment. A user of camera 502 may select to receive location, event, or environment specific updates or camera 502 may broadcast a current location, event or environment to DRM personalization authority server 222 and request updates based on the current location, event or environment.

In one example, DRM personalization authority server 222 may track which registered owners are attending a particular event and which registered camera owners are planning to attend the particular event and update DRM check cache 508 in the cameras of registered camera owners with more detailed element recognition descriptions for the registered owners planning to attend a particular event. In another example, when a user enters a restricted area, the owner of the restricted area may request that DRM personalization authority server 222 locally broadcast updates to DRM check caches 508 of authorized cameras with the rules and content descriptions and identity descriptions for the restricted area and the owner of the restricted area may only permit cameras within the area that are content management enabled cameras.

In addition, although not depicted, camera 502 may determine a location by implementing location detector 116 locally or by accessing a location detector service from a network accessible server 540. In one example, locally, camera 502 may include a GPS sensor that detects a location. In another example, locally, content descriptions in DRM check cache 508 may specify that content for a particular location, such that if camera 502 captures images that match the content for a particular location, normal CCRC check 506 or normal CCRC check 512 can infer the location of the camera. In addition, normal CCRC check 506 and normal CCRC check 512 may prompt a user of camera 502 to speak a location, which a speech-to-text converter converts into a text location, or to enter a location through a keypad. DRM check cache 508 may also include a directory of locations that a user can scroll through and select within a display interface on camera 502 to specify a location.

Normal CCRC check 512 may include a certification with the image indicating how the location was determined. When normal CCRC check 506 and normal CCRC check 512 determine usage rights for an image based on location, in one example, applicable DRM rules for a particular element captured in an image may specify that if the element is a private individual, that individual does not authorize capture of the individual's image if the user is located at an event.

In the example, by performing one or more of normal CCRC check 506 and normal CCRC check 512 at camera 502, camera 502 can prevent a user from photographing unauthorized elements within a image, to save the user time and money by notifying the user that the image could not be distributed within physical or network marketplaces, publications, websites, or other venues without permissions and by notifying the user of the owners of the rights to elements within an image, the likelihood of license availability for the elements, and the cost of licensing usage of the elements. In addition, in the example, by performing one or more of normal CCRC check 506 and normal CCRC check 512 at camera 502, usage rights are determined before an image is captured or with image capture, and a user can be notified, at camera 502, how to obtain rights to further usage of the image.

In the example, computer 520 receives a communication or transmission of the image captured at reference numeral 510, which triggers a normal CCRC check 522 to determine whether copying of the image captured by camera 502 is permitted by computer 520 according to usage rights received with the image or by analyzing the image to determine usage rights. Normal CCRC check 522 represents an instance of CCRC 114. Computer 520 represents a content management enabled device 104, such as content management enabled output device 208.

In the example, normal CCRC check 522 may regulate use of the copied captured image based on the usage rights received with the captured image from camera 502. In addition, normal CCRC check 522 may separately determine usage rights for the captured image copied to computer 520. In applying the usage rights, if restrictions are placed on copying the captured image to computer 520, then normal CCRC check 522 may blur unauthorized elements within the captured image, may direct the user to obtain or purchase additional usage rights for copying the captured image, may prompt the user to certify that the elements within the captured image are not the unauthorized element detected by normal CCRC check 522 or a previous CCRC instance, cancels the copying of the captured image, or deletes the captured image from all buffers, caches, and other memory of computer 520.

In the example, in addition to or as an alternative to normal CCRC check 522 authorizing copying of the captured image to computer 520, pre-application CCRC check 526 determines whether there are restrictions on an application on computer 520 using the captured image. In particular, an application may trigger pre-application CCRC check 526 or pre-application CCRC check 526 may monitor for an application receiving images, to determine what usage rights apply to the application usage of the captured image.

In determining usage rights for usage of the captured image by an application, pre-application PRBC check 526 may also detect whether the captured image is appropriate for a particular application. For example, some images may have restricted use under HIPAA or other regulatory acts or rules and pre-application CCRC check 526 may determine whether the content of the captured image includes elements which are protected under HIPAA and should only be opened within applications which are approved under HIPAA.

In addition, in determining usage rights for usage of the captured image, a pre-application CCRC check 526 may also detect what types of functions provided by the application are authorized for use with the captured image. For example, an application may include a cropping function, which enables cropping the captured image, however the usage rights for the element within the captured image may prohibit cropping the element in any manner, such that pre-application CCRC check 526 may disable the cropping tool or may limit the cropping tool to cropping areas of the captured image that do not include the restricted element. In another example, an application may represent a browser, where a user may access a social networking website via the browser, but if the usage rights for a captured image that the user requests to open in the browser limit usage to local usage, then pre-application CCRC check 526 may block any functions of the social networking site that allow uploading or saving an image to a memory location outside of computer 520.

As illustrated in log 550, in one example, normal CCRC check 506 performs a first check at "10:10:20" of the "initially captured image in viewfinder", CCRC check 506 receives a location of camera 502, and CCRC check 506 determines usage rights that "permit capture with limitations on uploading to network services because the image includes a particular person whose image is restricted by DRM rules when the person is located within 50 yards of the detected location of the camera." Next, as illustrated in log 550, once the image is captured, normal CCRC check 512 performs a second check at "10:10:22" and determines usage rights that "permit copying the image, but limit extracting a trademark from the captured image." In one example, normal CCRC check 506 may be set to only detect applicable usage rights for people, while normal CCRC check 512, once an image is captured, checks for other types of elements subject to digital rights management when within captured content. Next, as illustrated in log 550, computer 520 detects a copy of the captured content from camera 520 and normal CCRC check 522 performs a third check at "11:10:05" and determines the usage rights permit copying the captured image to the computer. In addition, normal CCRC check 522 verifies that the particular person identified by the camera is properly identified and that the person was within 50 yards of the location of the camera when the image was captured. In one example, computer 520 may be enabled to verify the identity of a person captured within an image with a greater probability of accuracy than camera 502. Next, as illustrated in log 550, an application is triggered to open the captured image and pre-application CCRC check 526 performs a fourth check at "11:15:10" and applies the usage rights that "permit the application to open the image, but limit extracting a trademark from the image or uploading the image to a network service."

If an application uses the captured image, as illustrated at reference numeral 530, a post-process CCRC check 532 may be triggered to monitor compliance with the usage rights and determine if any additional usage rights apply. For example, the usage rights determined by pre-application CCRC check 526 may specify one level of authorization for use of the captured image at a lower resolution, but a different level of authorization for use of the captured image at a higher resolution. Post-process CCRC check 532 may continue to monitor the resolution of the captured image as used in the application.

Normal CCRC check 522, pre-application CCRC check 526 and post-process CCRC check 532 may each access DRM check cache 528 in determining usage rights for the captured image. In the example DRM check cache 528 may access records from captured content rules database 542 or element recognition DB 544. In one example, computer 520 may include one or more of additional memory and processing power than camera 502, so the records stored in DRM cache 528 by computer 520 as accessed from network locations and a user, may be larger records, with more resolution or detail, than the records accessed by camera 502 in DRM check cache 508.

In the example, a user may attempt to upload the captured image to a network service of network accessible server 540. Responsive to network accessible server 540 receiving an upload of the captured image, pre-application CCRC check 546 is triggered to determine whether use of the captured image by the network service is restricted. If pre-application CCRC check 546 allows the uploading of the captured image to the network image, as illustrated at reference numeral 548, a post-process CCRC check 552 is triggered to monitor whether additional usage rights apply and whether there is compliance to the usage rights of the captured image by the network service.

Figure 7:
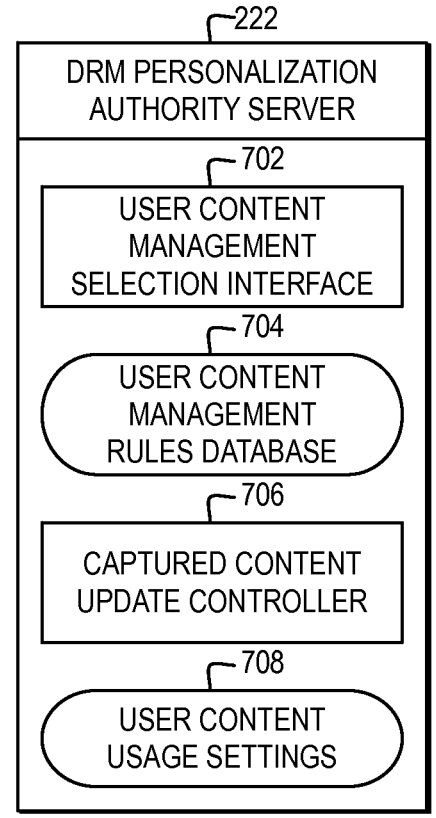
FIG. 7 is a block diagram depicting one example of a DRM content personalization service through which an owner of rights to content specifies those rights for applications to that content when captured by someone other than the owner of the rights to the content and through which a user capturing content specifies preferences for accessing licensing information and specifies usage limits.

Referring now to FIG. 7, a block diagram illustrates one example of a DRM content personalization service through which an owner of rights to content specifies those rights for application to that content when captured by someone other than the owner of the rights to the content and through which a user capturing content specifies preferences for accessing licensing and specifies usage limits. It will be understood that DRM personalization authority server 222 may include additional or alternate components to the components depicted and may be distributed across one or more systems.

In the example, DRM personalization authority server 222 may include a user content management selection interface 702. Through the user content management selection interface 702, which is implemented in a browser window, in a stand-alone application, or other available interface function, a user may select one or more preferences and location based rules for controlling content owned by the user when the content is captured without the permission of the user, which are stored in user content management rules database 704.

In addition, user content management selection interface 702 facilitates user specification of mappings of the content owned by the user for storage with location based rules for the content stored in user content management rules database 704. In one example, user content management selection interface 702 may facilitate an image capture system through which an image, gesturing, or movement of the user is captured and mapped into a three-dimensional image. In another example, user content management selection interface 702 may facilitate an interface for capturing audio or voice and converting the audio into digitally mapped characteristics or a sound signature. In yet another example, user content management selection interface 702 may facilitate user uploading of a protected mark.

Further, user content management selection interface 702 may facilitate user specification of the preferences for use of captured image by the user, when the user is not the owner of the rights to the captured image. User preferences for use of captured images by the user are stored in user content usage settings 708. In one example, a user may set preferences according to type of restricted content, such as whether the restricted content is image, audio or protected mark. In addition, a user may set preferences according to location. Further, a user may set preferences with financial transaction information, maximum and minimum licensing amounts, and other information for facilitating purchase of licenses for additional authorization for use of a captured image. In addition, a user may set preferences as to the devices that the user permits to access the user's settings and a user may set preferences as to the preferred usage of captured images.

A captured content update controller 706 facilitates updates of DRM managed content databases, DRM check caches, and CCRCs with current location based rules, current element mappings, current element recognition and voice recognition records and definitions, current user preferences for use of captured content, blocked or fraudulent account users, and other data updated with DRM personalization authority server 222. In facilitating updates, captured content update controller 706 may automatically send updates periodically to registered systems or may send updates when requested by a user or by a system. In sending updates, captured content update controller 706 may apply watermarking or embed the updates to certify that the updates are from DRM personalization authority server 222.

In addition, although not depicted, DRM personalization authority server 222 may implement a transaction controller for controlling any financial transactions required for restricting usage rights of captured content. In addition, DRM personalization authority server 222 may implement a communication controller for controlling communication required for restricting usage rights of captured content. Further, RM personalization authority server 222 may implement or access additional or alternate functions in order to distribute data, secure data, and receive data for restricting usage of captured content.

Figure 8:
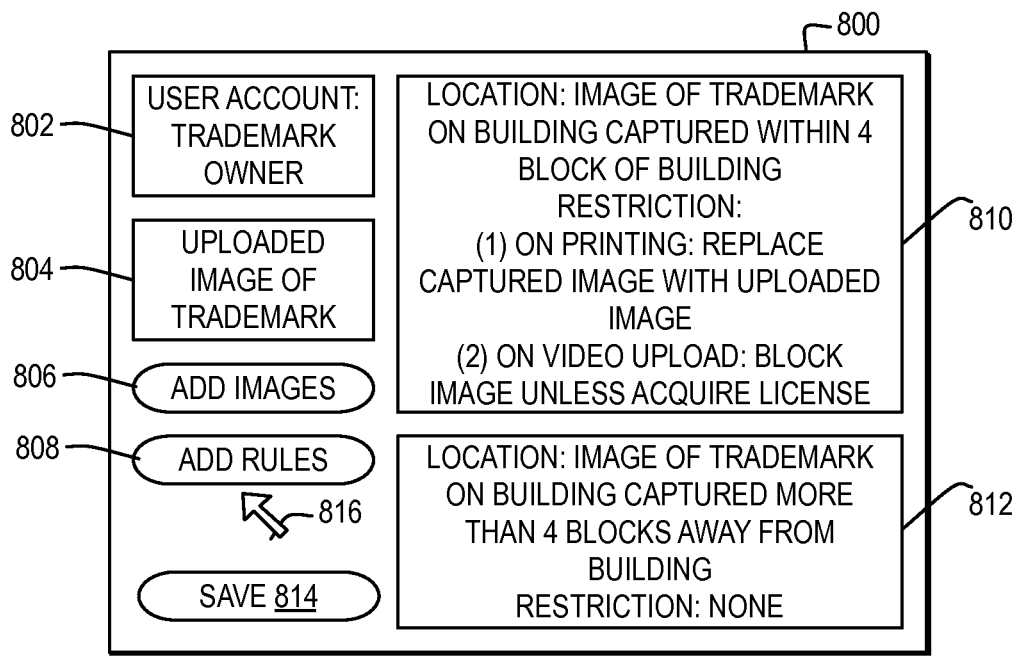
FIG. 8 is a block diagram depicting an example of an interface through which a user may specify the mapping for identifying elements within captured content and for setting rules for determining usage rights for the elements within captured content.

Referring now to FIG. 8, a block diagram illustrates an example of an interface through which a user may specify the mapping for identifying elements within captured content and for setting rules for determining usage rights for the content. In the example, within an interface 800, a user has logged into a user account for specifying management of content owned by the user when the content is captured.

In the example, within interface 800, a currently opened user account is identified as "trademark owner" as illustrated at reference numeral 802. A user account may be identified by a name, number, or other identifier. In addition, to access a user account, a user may be required to provide a password or otherwise authenticate the user's right to access the user account.

In addition, in the example, within interface 800, a listing of elements owned by the user are provided and an image representative of the owned elements are illustrated, such as the uploaded image of the restricted trademark illustrated at reference numeral 804. In another example, interface 800 may include multiple selectable images representative of owned elements, where a user can select to view the current profile specified for each element or edit the profile, through selecting the selectable images. In addition, in the example, a user may select an option to add images, as illustrated at reference numeral 806. A user may select to add rules to the currently selected image by selecting an option to add rules as illustrated at reference numeral 808. A user may select to save current profile selections to the user account by selecting to save as illustrated at reference numeral 814.

In one example, a user makes selections within interface 800 by positioning cursor 816 and entering an additional input. It will be understood that additional or alternate methods for user selections of options within interface 800 may be implemented. In addition, it will be understood that additional or alternate types of selectable options may be provided within interface 800.

In the example, a first rule illustrated at reference numeral 810 indicates that for the trademark, for a location of "image of trademark on building captured within four blocks of building" there are restrictions to use of the image. In one example, if the use is for "printing", the restriction is to "replace captured image with uploaded image", such that if a user wants to print content that includes the trademark, a clear representation of the trademark is included. In another example, if the use is for video upload to a network location, then the restriction is "block image unless license acquired", such that if a user wants to upload a video that includes the trademark, the user cannot show the trademark without contacting the trademark owner for a license.

In addition, in the example, a second rule illustrated at reference numeral 812 indicates that for the trademark, for a location of "image of trademark on building captured more than 4 blocks away from building" there are no restrictions to use of the image. In the example, where the trademark owner has a famous trademark that is often captured by others, the trademark owner can set the distance of capture so that printers, web services, and other third-parties who receive an image with the trademark captured in the image, can determine what usage rights are available for the image, without having to contact the trademark owner.

Referring now to FIG. 9, a high level logic flowchart illustrates a process and program for restricting usage of captured content. In the example, the process starts at block 900 and thereafter proceeds to block 902. Block 902 illustrates a determination whether captured content is detected by a CCRC. If captured content is detected, then the process passes to block 904. Block 904 illustrates determining whether there are any elements within the captured content that are subject to digital rights management for captured content. Next, block 906 illustrates a determination whether the captured content includes any portions with elements subject to digital rights management for captured content.

If the captured content does not include any portions with restricted elements, then the process passes to block 914. Block 914 depicts applying a certification to the captured content indicating there is no restriction on the usage of the captured content, and the process ends.

Returning to block 906, if the captured content includes any portions with restricted elements, then the process passes to block 908. Block 908 illustrates accessing at least one location based DRM rule for the restricted elements within the captured content. Next, block 910 depicts detecting at least one location associated with the captured content. Thereafter, block 912 illustrates applying the at least one location based DRM rule specified for the relevant location to restrict usage of the captured content, and the process ends.

With reference now to FIG. 10, a high level logic flowchart depicts a process and program for a policy based rights controller determining usage rights for controlling digital rights management of captured content. In the example, the process starts at block 1000 and thereafter proceeds to block 1002. Block 1002 depicts a determination whether captured content is received. If captured content is received, then the process passes to block 1004. Block 1004 illustrates writing the captured content to a raw data set. Next, block 1006 depicts adding a default DRM policy to the data. Thereafter, block 1008 illustrates watermarking the raw data set with an identification of the system performing analysis on the captured content, and the process passes to block 1010.

Block 1010 illustrates a determination whether a request is received to relax the DRM policy on the raw data set. If a request is not received, then the process passes to block 1030. Block 1030 illustrates specifying the modified raw data set as the captured content and the default DRM policy for the captured content as the usage rights, and the process ends. In one example, by specifying the modified raw data set as the captured content, the modified raw data set may replace the previously stored captured content within cache and other memory within a system.

Returning to block 1010, if a request to relax the DRM policy is received, then the process passes to block 1012. Block 1012 depicts extracting and obtaining pertinent subsets from the raw data set. In particular, in extracting and obtaining subsets, different layers of data or different resolutions of data may be extracted from the raw data set. Next, block 1014 illustrates sending the data subsets to the content analysis controller. Thereafter, block 1016 depicts a determination whether identified objects are received from the content analysis controller. As illustrated at block 1018, the policy based rights controller may provide additional layers or resolutions of data for analysis from the raw data set or from user entries of additional information for analysis. Once identified objects are received from the content analysis controller, the process passes to block 1020.

Block 1020 illustrates identifying a selection of DRM rules with element mappings that match the identified objects within a required percentage of points. Next, block 1022 depicts accessing at least one location associated with the captured content. Thereafter, block 1024 illustrates specifying the usage rights by a relaxed DRM policy set to the selection of DRM rules specified according to the at least one location. Next, block 1026 depicts adjusting the raw data set according to the relaxed DRM policy, including blocking, blurring, or replacing elements within the raw data set. Thereafter, block 1028 depicts specifying the modified raw data set as the captured content, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to a preferred embodiment, it will be understood by those skilled in the art that various changes in form and detail may be made therein without departing from the spirit and scope of the invention.

What is claimed is:

1. A method for digital rights management of captured content, comprising:

a computer receiving a certification from a user stating that captured content does not comprise a particular restricted element and a request from the user for an adjustment of a digital rights management rule identified for the captured content based on the captured content comprising the particular restricted element;

the computer adjusting at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content;

the computer monitoring whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification; and the computer, responsive to detecting that the other content associated by the user with the captured content after the certification is embedded in the captured content does indicate the captured content comprises the particular restricted element specified in the embedded certification, blocking use of the captured content by the user at the one or more devices.

2. The method according to claim 1, further comprising:

the computer receiving the certification for the captured content from a content controller, wherein the content controller analyzes the captured content to determine whether a portion of the captured content is subject to digital rights management protection specified for content captured independent of distribution of at least one restricted element within the captured content by an owner of the at least one restricted element and responsive to determining that the portion of the captured content is subject to digital rights management protection, the content controller selects at least one digital rights management rule associated with the portion.

3. The method according to claim 1, further comprising:
the computer controlling output of at least one identifier for each at least one restricted element identified in the captured content subject to the at least one digital rights management rule;
the computer displaying a selectable option for the user to certify that the captured content does not comprise the particular restricted element from among the at least one restricted element; and
the computer, responsive to the user selecting the selectable option, creating the certification from the user stating that the captured content does not comprise the particular restricted element and the request from the user for an adjustment of the digital rights management rule identified for the captured content based on the captured content comprising the particular restricted element.

4. The method according to claim 1, further comprising:
the computer, responsive to the licensing service detecting the usage of the captured content by the user does not match the certification statement, negotiating for one or more rights to use the particular restricted element in the captured content between the user requesting access to the captured content and one or more owners of the rights of the particular restricted element originally identified in the captured content.

5. The method according to claim 1, wherein the computer monitoring whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification, further comprises:
receiving other content associated by the user with the captured content after the certification is embedded with the captured content from the device, where the other content comprises a content tag associated with the captured content when displayed by the device.

6. The method according to claim 1, wherein the computer monitoring whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification, further comprises:
detecting whether the other content, associated by the user with the captured content after the certification is embedded in the captured content, indicates the captured content comprises the particular restricted element specified in the embedded certification by detecting the other content contains the particular restricted element.

7. A computer system for digital rights management of captured content, comprising:
one or more processors, one or more computer-readable memories and one or more computer-readable, tangible storage devices;
program instructions, stored on at least one of the one or more storage devices for execution by at least one of the one or more processors via at least one of the one or more memories, to receive a certification from a user stating that captured content does not comprise a particular restricted element and a request from the user for an adjustment of a digital rights management rule identified for the captured content based on the captured content comprising the particular restricted element;
program instructions, stored on at least one of the one or more storage devices for execution by at least one of the one or more processors via at least one of the one or more memories, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content;
program instructions, stored on at least one of the one or more storage devices for execution by at least one of the one or more processors via at least one of the one or more memories, to monitor whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification; and
program instructions, stored on at least one of the one or more storage devices for execution by at least one of the one or more processors via at least one of the one or more memories, responsive to detecting that the other content associated by the user with the captured content after the certification is embedded in the captured content does indicate the captured content comprises the particular restricted element specified in the embedded certification, to block use of the captured content by the user at the one or more devices.

8. The computer system according to claim 7, further comprising:
program instructions, stored on at least one of the one or more storage devices for execution by at least one of the one or more processors via at least one of the one or more memories, to receive the certification for the captured content from a content controller, wherein the content controller analyzes the captured content to determine whether a portion of the captured content is subject to digital rights management protection specified for content captured independent of distribution of at least one restricted element within the captured content by an owner of the at least one restricted element and responsive to determining that the portion of the captured content is subject to digital rights management protection, the content controller selects at least one digital rights management rule associated with the portion.

9. The computer system according to claim 7, further comprising:
    program instructions, stored on at least one of the one or more storage devices for execution by at least one of the one or more processors via at least one of the one or more memories, to control output of at least one identifier for each at least one restricted element identified in the captured content subject to the at least one digital rights management rule;
    program instructions, stored on at least one of the one or more storage devices for execution by at least one of the one or more processors via at least one of the one or more memories, to display a selectable option for the user to certify that the captured content does not comprise the particular restricted element from among the at least one restricted element; and
    program instructions, stored on at least one of the one or more storage devices for execution by at least one of the one or more processors via at least one of the one or more memories, responsive to the user selecting the selectable option, to create the certification from the user stating that the captured content does not comprise the particular restricted element and the request from the user for an adjustment of the digital rights management rule identified for the captured content based on the captured content comprising the particular restricted element.

10. The computer system according to claim 7, further comprising:
    program instructions, stored on at least one of the one or more storage devices for execution by at least one of the one or more processors via at least one of the one or more memories, responsive to the licensing service detecting the usage of the captured content by the user does not match the certification statement, to negotiate for one or more rights to use the particular restricted element in the captured content between the user requesting access to the captured content and one or more owners of the rights of the particular restricted element originally identified in the captured content.

11. The computer system according to claim 7, wherein program instructions, stored on at least one of the one or more storage devices for execution by at least one of the one or more processors via at least one of the one or more memories, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content, further comprises:
    program instructions, stored on at least one of the one or more storage devices for execution by at least one of the one or more processors via at least one of the one or more memories, to receive other content associated by the user with the captured content after the certification is embedded with the captured content from the device, where the other content comprises a content tag associated with the captured content when displayed by the device.

12. The computer system according to claim 7, wherein program instructions, stored on at least one of the one or more storage devices for execution by at least one of the one or more processors via at least one of the one or more memories, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content, further comprises:
    program instructions, stored on at least one of the one or more storage devices for execution by the at least one of the one or more processors via at least one of the one or more memories, to detect whether the other content, associated by the user with the captured content after the certification is embedded in the captured content, indicates the captured content comprises the particular restricted element specified in the embedded certification by detecting the other content contains the particular restricted element.

13. A computer program product for digital rights management of captured content, comprising:
    one or more computer-readable, tangible storage devices;
    program instructions, stored on at least one of the one or more storage devices, to receive a certification from a user stating that captured content does not comprise a particular restricted element and a request from the user for an adjustment of a digital rights management rule identified for the captured content based on the captured content comprising the particular restricted element;
    program instructions, stored on at least one of the one or more storage devices, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content;
    program instructions, stored on at least one of the one or more storage devices, to monitor whether usage of the captured content by the user, through the one or more devices receiving the content, matches the certification, by receiving other content, associated by the user with the captured content after the certification is embedded in the captured content, from one or more devices that monitor other content associated with the captured content when displayed by the one or more devices, and detecting whether the other content, associated by the user with the captured content after the certification is embedded in the captured content, indicates the captured content comprises the particular restricted element specified in the embedded certification; and
    program instructions, stored on at least one of the one or more storage devices, responsive to detecting that the other content associated by the user with the captured content after the certification is embedded in the captured content does indicate the captured content comprises the particular restricted element specified in the embedded certification, to block use of the captured content by the user at the one or more devices.

14. The computer program product according to claim 13, further comprising:
    program instructions, stored on at least one of the one or more storage devices, to receive the certification for the captured content from a content controller, wherein the content controller analyzes the captured content to determine whether a portion of the captured content is subject to digital rights management protection specified for content captured independent of distribution of at least one restricted element within the captured content by an owner of the at least one restricted element and responsive to determining that the portion of the captured content is subject to digital rights management protection, the content controller selects at least one digital rights management rule associated with the portion.

15. The computer program product according to claim 13, further comprising:

program instructions, stored on at least one of the one or more storage devices, to control output of at least one identifier for each at least one restricted element identified in the captured content subject to the at least one digital rights management rule;

program instructions, stored on at least one of the one or more storage devices, to display a selectable option for the user to certify that the captured content does not comprise the particular restricted element from among the at least one restricted element; and program instructions, stored on at least one of the one or more storage devices, responsive to the user selecting the selectable option, to create the certification from the user stating that the captured content does not comprise the particular restricted element and the request from the user for an adjustment of the digital rights management rule identified for the captured content based on the captured content comprising the particular restricted element.

16. The computer program product according to claim 13, further comprising:

program instructions, stored on at least one of the one or more storage devices, responsive to the licensing service detecting the usage of the captured content by the user does not match the certification statement, to negotiate for one or more rights to use the particular restricted element in the captured content between the user requesting access to the captured content and one or more owners of the rights of the particular restricted element originally identified in the captured content.

17. The computer program product according to claim 13, wherein program instructions, stored on at least one of the one or more storage devices, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content, further comprises:

program instructions, stored on at least one of the one or more storage devices, to receive other content associated by the user with the captured content after the certification is embedded with the captured content from the device, where the other content comprises a content tag associated with the captured content when displayed by the device.

18. The computer program product according to claim 13, wherein program instructions, stored on at least one of the one or more storage devices, to adjust at least one term of the digital rights management rule to reflect that the captured content does not comprise the particular restricted element by embedding the certification in the captured content with the adjusted digital rights management rule, wherein the certification defines permitted usage of the captured content by one or more devices receiving the captured content and specifies the particular restricted element certified by the user as not included in the captured content, further comprises:

program instructions, stored on at least one of the one or more storage devices, to detect whether the other content, associated by the user with the captured content after the certification is embedded in the captured content, indicates the captured content comprises the particular restricted element specified in the embedded certification by detecting the other content contains the particular restricted element.

* * * * *